(12) United States Patent
Johnson et al.

(10) Patent No.: US 8,479,467 B2
(45) Date of Patent: *Jul. 9, 2013

(54) PREFABRICATED ROOFING PANEL COMPOSITE

(75) Inventors: Walter Alexander Johnson, Columbus, IN (US); Joel Evan Hazy, Brighton, CO (US)

(73) Assignee: Johns Manville, Denver, CO (US)

( * ) Notice: Subject to any disclaimer, the term of this patent is extended or adjusted under 35 U.S.C. 154(b) by 56 days.

This patent is subject to a terminal disclaimer.

(21) Appl. No.: 13/209,710

(22) Filed: Aug. 15, 2011

(65) Prior Publication Data

US 2012/0003455 A1    Jan. 5, 2012

Related U.S. Application Data

(63) Continuation of application No. 11/974,960, filed on Oct. 17, 2007, now abandoned, and a continuation-in-part of application No. 12/703,308, filed on Feb. 10, 2010, now Pat. No. 8,105,685, which is a continuation of application No. 11/519,042, filed on Sep. 11, 2006, now Pat. No. 7,811,663, which is a continuation-in-part of application No. 10/984,122, filed on Nov. 9, 2004, now abandoned.

(51) Int. Cl.
*E04C 1/00*    (2006.01)
(52) U.S. Cl.
USPC ........................................ 52/309.1; 52/309.4

(58) Field of Classification Search
USPC .................. 52/309.1, 309.4, 309.7, 309.14
See application file for complete search history.

(56) References Cited

U.S. PATENT DOCUMENTS

| 3,677,874 | A | 7/1972 | Sterrett et al. | |
|---|---|---|---|---|
| 7,718,253 | B2* | 5/2010 | Griffin et al. | 428/315.9 |
| 7,811,663 | B2* | 10/2010 | Paradis et al. | 428/315.9 |
| 2003/0186045 | A1 | 10/2003 | Wardle et al. | |
| 2006/0179749 | A1* | 8/2006 | Brandt et al. | 52/309.7 |
| 2009/0269565 | A1* | 10/2009 | Peng | 428/220 |

* cited by examiner

*Primary Examiner* — Basil Katcheves
(74) *Attorney, Agent, or Firm* — Robert D. Touslee

(57) ABSTRACT

A prefabricated roofing panel composite includes a prefabricated cover board having a high-density polymer or predominantly polymer material core layer having a density between 6 lbs/ft$^3$ and 25 lbs/ft$^3$ and an insulation board that has a low-density polymer or predominantly polymer material foam core layer having a density less than or equal to about 2 lbs/ft$^3$. The cover board may have a waterproofing membrane forming the top major surface of the cover board. The low-density foam core layer of the insulation board may be formed with the high-density core layer of the cover board being currently or subsequently formed over and bonded to a top major surface of the low-density foam core layer in the same operation or preformed insulation boards may be fed into a production line with the high-density core layer of the cover board being formed over and bonded to top major surfaces of the low-density foam core layers of the insulation boards.

27 Claims, 4 Drawing Sheets

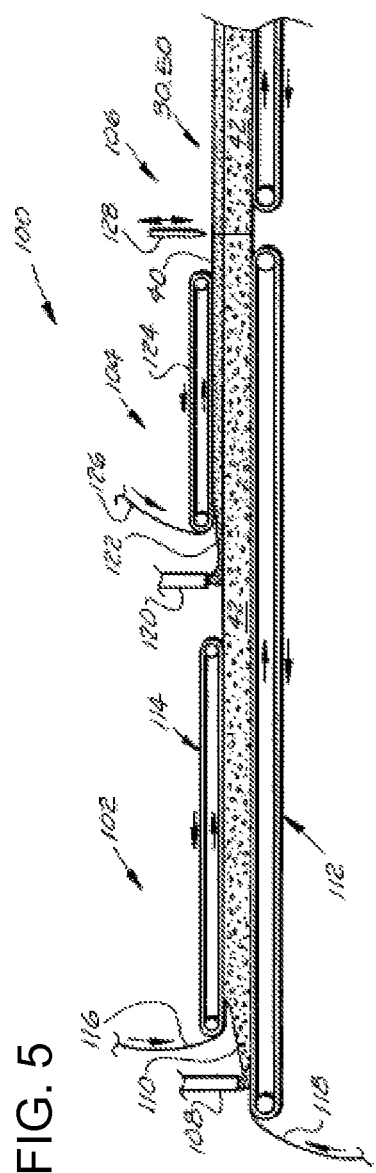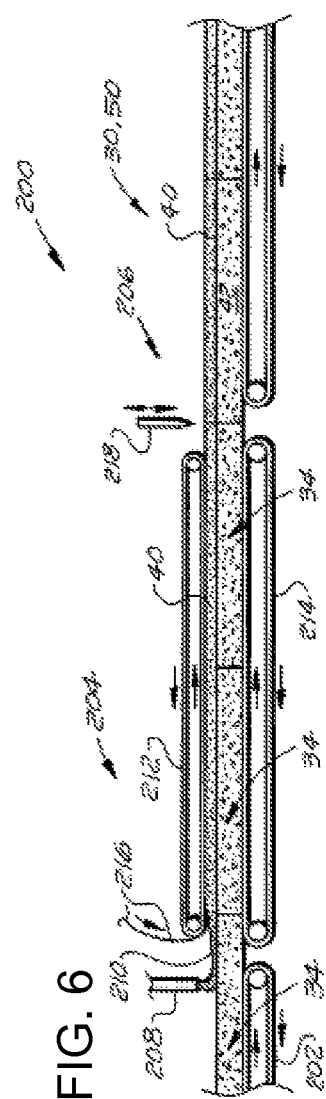

PREFABRICATED ROOFING PANEL COMPOSITE

This application is a continuation of co-pending U.S. patent application Ser. No. 11/974,960, filed Oct. 17, 2007 and titled "Prefabricated Roofing Panel Composite", the entire disclosure of which is hereby incorporated by reference herein for all purposes, and this application is a continuation-in-part of co-pending U.S. patent application Ser. No. 12/703,308, filed Feb. 10, 2010 and titled "Roofing Cover Board, Roofing Panel Composites, and Method", which is a continuation of U.S. patent application Ser. No. 11/519,042, filed Sep. 11, 2006 and titled "Roofing Cover Board, Roofing Panel Composites, and Method" (now U.S. Pat. No. 7,811,663), which is a continuation-in-part of U.S. patent application Ser. No. 10/984,122, filed Nov. 9, 2004 and titled "Roofing Cover Board, Roofing Panel Composite, and Method" (now abandoned), the entire disclosures of which are hereby incorporated by reference herein for all purposes.

FIELD OF ART

The present disclosure relates to a prefabricated roofing panel composite, which includes the high-density polymer or predominantly polymer material cover board and a low-density polymer or predominantly polymer material foam insulation board, and to a method of making the roofing panel composite.

BACKGROUND

Commercial and industrial buildings typically have roofs with low-slope roof decks. The roofing systems for these roofs with low-slope roof decks typically include one or more layers of a low-density roofing insulation, a layer of roofing cover boards that overlie the low-density roofing insulation layer(s), and a waterproofing membrane that overlies the layer of cover boards. The layer(s) of low-density insulation, such as a low-density polymer-based foam insulation, if not protected, can be partially crushed or otherwise damaged from worker traffic over the insulation, the placement of heaving objects on the insulation, the weather, and other causes commonly encountered in roofing construction. The layer of roofing cover boards that overlies the one or more layers of low-density insulation, protects the more fragile low density insulation from damage, acts as a fire barrier, provides a suitable substrate for the attachment of the overlying waterproofing membrane, and augments the insulating function of the low-density insulation. The uppermost waterproofing membrane layer overlying the cover board layer protects the underlying cover board and insulation layers from moisture and other adverse climatic conditions. Normally, these three components (the low-density insulation boards, the roofing cover boards, and the waterproofing membrane) of the roofing system are separately manufactured and separately and successively applied to the low-slope roof deck. While these roofing systems function very well, there has remained a need to prefabricated roofing panel composites that combine at least an insulation board and a roofing cover board layer, and that, preferably, combine an insulation board, a roofing cover board layer and a waterproofing membrane. With the use of such prefabricated roofing panel composites, roofing systems for low-slope roof decks can be improved and/or the time, labor and costs associated with the installation of roofing systems on low-slope roof decks can be reduced. Provided is an improved prefabricated roofing panel cover board and insulation board composite, and an improved prefabricated roofing panel cover board, insulation board, and waterproofing membrane composite. Also provided is a method for making the prefabricated roofing panel composites including roofing cover board that is highly productive, relatively economical, and efficient.

SUMMARY

The presently disclosed high-density polymer or predominantly polymer material cover board is or includes a high-density polymer or predominantly polymer material core layer with a density between 6 lbs/ft$^3$ and 25 lbs/ft$^3$. The density and thickness of the high-density polymer or predominantly polymer material core layer of the cover board are selected to provide the cover board with the compressive strength to resist deformation so that the cover board protects low-density insulation layers overlaid by the cover board from damage and so that the cover board has surface characteristics that promote the bonding of a top facer, e.g., waterproofing membrane, to the high-density core layer of the cover board. The presently disclosed prefabricated high-density polymer or predominantly polymer material cover board is relatively lightweight and easily cut. This makes the prefabricated roofing panel cover board and insulation board composite easier to install and increases the productivity of workers installing the prefabricated roofing panel cover board and insulation board composites. In addition, the presently disclosed high-density polymer or predominantly polymer material cover board does not support mold growth, there are no glass fiber shards to cause skin and eye irritation for installers, and the cover board is not negatively impacted by the application of solvents, hot asphalt, or adhesives.

The presently disclosed prefabricated roofing panel composites include the cover board with its high density polymer or predominantly polymer material core layer that has a density between 6 lbs/ft$^3$ and 25 lbs/ft$^3$ and a low-density insulation board with its low-density polymer or predominantly polymer material foam core layer that has a density less than or equal to about 2 lbs/ft$^3$. The bottom major surface of the high-density cover board overlies and is bonded to the top major surface of the low-density foam insulation board and, in a preferred embodiment, the high-density cover board includes a waterproofing membrane facer that overlies and is bonded to the top major surface of the high-density polymer or predominantly polymer material core of the cover board. The roofing panel composite may be secured in a roofing system mechanically with screws, nails or other mechanical fasteners and/or adhesively with asphalt or other adhesives.

When making the presently disclosed prefabricated roofing panel composites, the low-density polymer or predominantly polymer material foam core layer of the low-density foam insulation board may be formed with the high-density core layer of the high-density cover board being concurrently or subsequently formed over and bonded to a top major surface of the low-density foam insulation board in the same operation. In an alternate version of the method for making the presently disclosed prefabricated roofing panel composite, preformed low-density foam insulation boards may be fed into a production line with the high-density polymer or predominantly polymer material core layer of the cover board being formed over and bonded to the top major surfaces of the preformed low-density foam insulation boards. In the method for making the presently disclosed prefabricated roofing panel composite, no facer or a common facer may be used intermediate the high-density core layer of the cover board and the low-density foam core layer of the foam insulation board. In addition, a waterproofing membrane facer may be applied and bonded to the top major surface of the high-density polymer or predominantly polymer material core layer of the cover board.

In an embodiment, the presently disclosed prefabricated roofing system panel comprises a cover board an insulation board. The cover board can comprise a high-density predominantly polymer material core layer, the high-density core layer of the cover board having a density between 6 lbs/ft$^3$ and 25 lbs/ft$^3$, the high-density core layer of the cover board having a length, a width, and a thickness, the high density core layer of the cover board having a top major surface and a bottom major surface that are each defined by the length and the width of the high density core layer. The insulation board can comprise a low-density predominantly polymer material foam core layer, the low-density foam core layer of the insulation board having a density less than or equal to about 2 lbs/ft$^3$, the low-density foam core layer of the insulation board having a length, a width, and a thickness, the low-density foam core layer of the insulation board having a top major surface and a bottom major surface that are each defined by the length and the width of the low-density foam core layer. The bottom major surface of the high-density core layer of the cover board and the top major surface of the low-density foam core layer of the insulation board can be substantially coextensive. The cover board and the insulation board can have a common nonwoven mat facer (e.g., a fiberglass mat) that overlies and is bonded to the bottom major surface of the high-density core layer of the cover board and the top major surface of the low-density foam core layer of the insulation board to bond the cover board and the insulation board together.

BRIEF DESCRIPTION OF THE DRAWINGS

FIG. 5 is a schematic side view of a first production line that can be used to make a presently disclosed prefabricated roofing panel composite that includes a high-density polymer or predominantly polymer material cover board and a low-density polymer or predominantly polymer material foam insulation board.

FIG. 6 is a schematic side view of a second production line that can be used to make a presently disclosed prefabricated roofing panel composite that includes a high-density polymer or predominantly polymer material cover board and a low-density polymer or predominantly polymer material foam insulation board.

DETAILED DESCRIPTION

Figure 1:
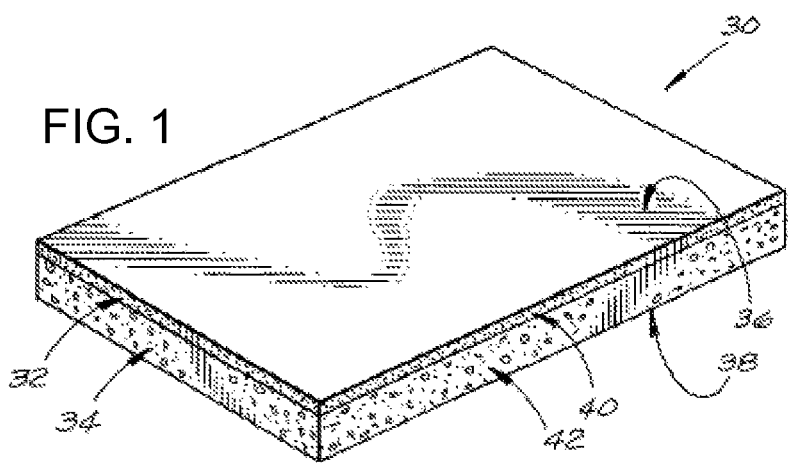
FIG. 1 is a schematic perspective view of a presently disclosed prefabricated roofing panel composite that includes a high-density polymer or predominantly polymer material cover board and a low-density polymer or predominantly polymer material foam insulation board.

FIG. 1 is a schematic perspective view of a presently disclosed first prefabricated roofing panel composite 30. The prefabricated roofing panel composite 30 includes a high-density polymer or predominantly polymer material cover board 32 and an insulation board 34 that, as shown, are bonded directly together. The prefabricated roofing panel composite 30 has a top major surface 36 and a bottom major surface 38 that are each defined by the length and the width of the roofing panel composite. The prefabricated roofing panel composite 30 typically has a width of about four feet or greater and a length of about four feet or greater, preferably, about eight feet or greater and could have lengths that are limited only by the ability to store, transport and handle the roofing panel composites prior to installation.

In the prefabricated roofing panel composite 30, the cover board 32 has a high-density polymer or predominantly polymer material core layer 40. The high-density polymer or predominantly polymer material core layer 40 of the cover board 32 in the prefabricated roofing panel composite 30 has a density between 6 lbs/ft$^3$ and 25 lbs/ft$^3$ and preferably a density of at least 8 lbs/ft$^3$. The high-density polymer or predominantly polymer material core layer 40 of the cover board 32 in the prefabricated roofing panel composite has a thickness of about 0.25-0.5 inches. The density and thickness of the high-density polymer or predominantly polymer material core layer 40 of the cover board 32 are selected to provide the cover board with the compressive strength to resist deformation and protect the low-density insulation board 34 that is overlaid by the cover board from damage, and to provide surface characteristics that promote the bonding of a top facer, e.g., a waterproofing membrane, to the high-density core layer 40 of the cover board.

The insulation board 34 in the prefabricated roofing panel composite 30 includes a low-density polymer or predominantly polymer material foam core layer 42. The low-density polymer or predominantly polymer material foam core layer 42 of the insulation board 34 has a density less than or equal to about 2 lbs/ft$^3$, preferably less than 4 lbs/ft$^3$, and typically a density between about 1 lbs/ft$^3$ and about 3 lbs/ft$^3$. The low-density polymer or predominantly polymer material foam core layer 42 has a thickness of about 0.50-3.50 inches. The density and thickness of the low-density polymer or predominantly polymer material foam core layer 42 of the insulation board 34 are selected to provide the prefabricated roofing panel composite 30 with the desired insulating properties for the roofing system application.

The high-density polymer or predominantly polymer material core layer of the cover board may be made of various high-density polymer or predominantly polymer materials (e.g., a high-density polyisocyanurate, polyurethane, polystyrene, or phenolic material or a high-density material made of a blend of these materials; a high-density polyisocyanurate, polyurethane, polystyrene, or phenolic foam material or a high-density foam material made of a blend of these materials; a high-density predominantly polyisocyanurate, polyurethane, polystyrene, or phenolic material with inorganic filler(s) or a high-density material made of a blend of these materials with filler(s); a high-density predominantly polyisocyanurate, polyurethane, polystyrene, or phenolic foam material with inorganic filler(s) or a high-density foam material made of a blend of these materials with filler(s), a high-density material made of other thermoset matrix polymers; etc.). However, a preferred material for the high-density core layer is a high-density polyisocyanurate or predominantly polyisocyanurate material or foam material. The predominantly polymer materials of the high-density core layer may contain various powdered and liquid fillers, fiber reinforcements, fungi growth-inhibiting agents, and fire-retardants to reduce the cost of and/or modify the properties of the high-density core layer, such as but not limited to the compressive strength, the toughness, the flexibility, the friability, and the fire resistance of the core layer. Examples of fillers that may be used in the high-density predominantly polymer material core layer are fillers such as limestone ($CaCO_3$), fiberglass, recycled polyisocyanurate dust, and extenders/plasticizers.

The low-density polymer or predominantly polymer material foam core layer 42 of the insulation board 34 may be made of various low-density polymer or predominantly polymer foam materials (e.g., a low-density polyisocyanurate, polyurethane, polystyrene, or phenolic foam material or a low-density foam material made of a blend of these materials; a low-density predominantly polyisocyanurate, polyurethane, polystyrene, or phenolic foam material with inorganic filler(s) or a low-density foam material made of a blend of these materials with filler(s), a low-density foam material made of other thermoset matrix polymers; etc.). However, a preferred material for the low-density core layer 42 is a low-density polyisocyanurate or predominantly polyisocyanurate foam material.

When the high-density core layer 40 is made of a predominantly polymer material, the high-density predominantly polymer material of the core layer 40 may contain various powdered and liquid fillers, fiber reinforcements, fire-retardants, fungi growth-inhibiting agents, etc. to reduce the cost and/or modify the properties of the high-density core layer 40 (such as but not limited to the compressive strength, the flexibility, the friability, the fire resistance of the core layer). When the low-density core layer 42 is made of a predominantly polymer material foam, the low-density predominantly polymer material foam core layer 42 may contain various powdered and liquid fillers fiber reinforcements, fire-retardants, fungi growth-inhibiting agents, etc. to reduce the cost and/or modify the properties of the low-density predominantly polymer material foam core layer. Examples of fillers that may be used in the high-density core layer 40 of the cover board 32 and the low-density core layer 42 of the insulation board 34 are fillers such as limestone ($CaCO_3$), fiberglass, recycled polyisocyanurate dust, and extenders/plasticizers.

While, as shown in FIG. 1, the prefabricated roofing panel composite 30 has no facers, the prefabricated roofing panel composite 30 could have a common facer intermediate and bonded to both the bottom major surface of the cover board core layer 40 and the top major surface of the insulation board core layer 42, a top facer bonded to the top major surface of the cover board core layer 40, and/or a bottom facer bonded to the bottom major surface of the insulation board core layer 42. When used, the common facer of the prefabricated roofing panel composite 30 may be any sheet material with good bonding surfaces that facilitates a good bond between the cover board 32 and insulation board 34, such as but not limited to woven or nonwoven mats made of glass fibers, other fibers or filaments, scrims, etc. When used, the top facer of the prefabricated roofing panel composite 30 overlies the entire or substantially the entire top major surface of the high-density core layer 40 of the cover board 32. The top facer of the prefabricated roofing panel composite 30 may be any sheet material that provides a suitable top major surface for the prefabricated roofing panel composite 30, such as but not limited to paper, foil, woven or nonwoven mats made of fiberglass or other fibers or filaments, scrims, etc. When used, the bottom facer of the prefabricated roofing panel composite 30 overlies the entire or substantially the entire bottom surface of the low-density foam core layer 42 of the insulation board 34. The bottom facer of the prefabricated roofing panel composite 30 may be any sheet material that provides a suitable bottom major surface for the roofing panel composite 30, such as but not limited to paper, foil, woven or nonwoven mats made of fiberglass or other fibers or filaments, scrims, etc.

Figure 2:
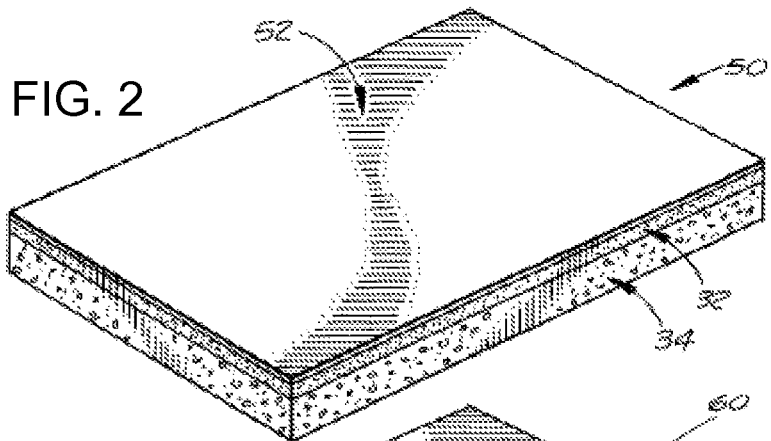
FIG. 2 is a schematic perspective view of a presently disclosed prefabricated roofing panel composite that includes a high-density polymer or predominantly polymer material cover board, a low-density polymer or predominantly polymer material foam insulation board, and a top facer.

FIG. 2 is a schematic perspective view of a presently disclosed prefabricated roofing panel composite 50. The prefabricated roofing panel composite 50 includes the high-density polymer or predominantly polymer material cover board 32 and the low-density polymer or predominantly polymer material foam insulation board 34 that, as shown in FIG. 2, are bonded directly together, and a top facer 52. Other than the inclusion of the top facer 52, the prefabricated roofing panel composite 50 is the same as the prefabricated roofing panel composite 30 of FIG. 1.

The top facer 52 of the prefabricated roofing panel composite 50 is bonded to and overlies the entire or substantially the entire top surface of the high-density polymer or predominantly polymer material core layer of the cover board 32. The top facer 52 of the prefabricated roofing panel composite 50 may be any sheet material that provides a suitable top major surface for the cover board and facer composite, such as but not limited to paper, foil, woven or nonwoven mats made of fiberglass or other fibers or filaments, scrims, etc. However, a preferred sheet material for the top facer 52 is a sheet material that serves the dual function of providing a facing during the manufacturing process and a waterproofing membrane on the finished product such as but not limited to a bituminous or modified bituminous membrane, or a single ply membrane (e.g., a EPDM, PVC, or TPO membrane). Where the top facer 52 is a waterproofing membrane, the facer may extend beyond the high-density core layer of the cover board 32 on one or more of the four sides of the core layer, e.g., beyond a side edge and an end edge of the top major surface of the core layer to provide overlaps for sealing with the membranes of adjacent panels.

While, as shown in FIG. 2, the prefabricated roofing panel composite 50 only has a top facer 52, the prefabricated roofing panel composite 50 could have a common facer intermediate and bonded to both the bottom major surface of the cover board 32 core layer 40 and the top major surface of the insulation board 34 core layer 42, and/or a bottom facer bonded to the bottom major surface of the insulation board 34 core layer 42. When used, the common facer of the prefabricated roofing panel composite 50 may be any sheet material with good bonding surfaces that facilitates a good bond between the cover board 32 and insulation board 34, such as but not limited to woven or nonwoven mats made of glass fibers, other fibers or filaments, scrims, etc. When used, the bottom facer of the prefabricated roofing panel composite 50 overlies the entire or substantially the entire bottom surface of the low-density foam core layer of the insulation board 34. The bottom facer of the prefabricated roofing panel composite 50 may be any sheet material that provides a suitable bottom major surface for the roofing panel composite 50, such as but not limited to paper, foil, woven or nonwoven mats made of fiberglass or other fibers or filaments, scrims, etc.

Figure 3:
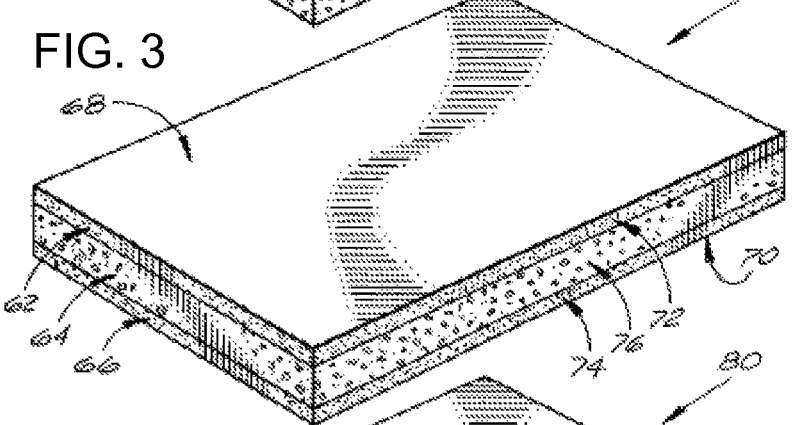
FIG. 3 is a schematic perspective view of a presently disclosed prefabricated roofing panel composite that includes a high-density polymer or predominantly polymer material cover board, a low-density polymer or predominantly polymer material foam insulation board, and a high-density polymer or predominantly polymer material baseboard.

FIG. 3 is a schematic perspective view of a presently disclosed prefabricated roofing panel composite 60 that includes: a high-density polymer or predominantly polymer material cover board 62, a low-density polymer or predominantly polymer material foam insulation board 64, and a high-density polymer or predominantly polymer material baseboard 66. The high-density polymer or predominantly polymer material cover board 62 and baseboard 66 may have the same density or different densities. As shown in FIG. 3, the cover board 62, the insulation board 64, and the baseboard 66 are bonded directly together. The prefabricated roofing panel composite 60 has a top major surface 68 and a bottom major surface 70 that are each defined by the length and the width of the prefabricated roofing panel composite. The prefabricated roofing panel composite 60 typically has a width of about four feet or greater and a length of about four feet or greater, preferably, about eight feet or greater and could have lengths that are limited only by the ability to store, transport and handle the roofing panel composites prior to installation.

In the prefabricated roofing panel composite 60, the cover board 62 has a high-density polymer or predominantly polymer material core layer 72 and the baseboard 66 has a high-density polymer or predominantly polymer material core layer 74. The high-density polymer or predominantly polymer material core layers 72 and 74 each have a density between 6 lbs/ft$^3$ and 25 lbs/ft$^3$ and preferably a density of at least 8 lbs/ft$^3$. The high-density polymer or predominantly polymer material core layer 72 of the cover board 62 and the high-density polymer or predominantly polymer material core layer 74 of the baseboard 66 each have a thickness of about 0.25-0.5 inches. The density and thickness of the high-density polymer or predominantly polymer material core layer 72 of the cover board 62 are selected to provide the cover board with the compressive strength to resist deformation and protect the low-density insulation board 64 that is overlaid by the cover board from damage, and to provide surface characteristics that promote the bonding of a top facer, e.g., a waterproofing membrane, to the core layer 72 of the cover board.

The insulation board 64 in the prefabricated roofing panel composite 60 includes a low-density polymer or predominantly polymer foam core layer 76. The low-density polymer or predominantly polymer material foam core layer 76 of the insulation board 64 has a density less than or equal to about 2 lbs/ft$^3$, preferably less than 4 lbs/ft$^3$, and typically a density between about 1 lbs/ft$^3$ and about 3 lbs/ft$^3$. The low-density polymer or predominantly polymer material foam core layer 76 has a thickness of about 0.50-3.50 inches. The density and thickness of the low-density polymer or predominantly polymer material foam core layer 76 of the insulation board 64 are selected to provide the prefabricated roofing panel composite 60 with the desired insulating properties for the roofing system application.

The high-density polymer or predominantly polymer material core layers 72 and 74 of the cover board 62 and the baseboard 66 may be made of various high-density polymer or predominantly polymer materials (e.g., a high-density polyisocyanurate, polyurethane, polystyrene, or phenolic material or a high-density material made of a blend of these materials; a high-density polyisocyanurate, polyurethane, polystyrene, or phenolic foam material or a high-density foam material made of a blend of these materials; a high-density predominantly polyisocyanurate, polyurethane, polystyrene, or phenolic material with inorganic filler(s) or a high-density material made of a blend of these materials with filler(s); a high-density predominantly polyisocyanurate, polyurethane, polystyrene, or phenolic foam material with inorganic filler(s) or a high-density foam material made of a blend of these materials with filler(s), a high-density material made of other thermoset matrix polymers; etc.). However, a preferred material for the high-density core layers 72 and 74 is a high-density polyisocyanurate or predominantly polyisocyanurate material or foam material.

The low-density polymer or predominantly polymer material foam core layer 76 of the insulation board 64 may be made of various low-density polymer or predominantly polymer foam materials (e.g., a low-density polyisocyanurate, polyurethane, polystyrene, or phenolic foam material or a low-density foam material made of a blend of these materials; a low-density predominantly polyisocyanurate, polyurethane, polystyrene, or phenolic foam material with inorganic filler(s) or a low-density foam material made of a blend of these materials with filler(s), a low-density material made of other thermoset matrix polymers; etc.). However, a preferred material for the low-density core layer 76 is a low-density polyisocyanurate or predominantly polyisocyanurate foam material.

When the high-density core layers 72 and 74 are made of a predominantly polymer material, the high-density predominantly polymer material of the core layers 72 and 74 may contain various powdered and liquid fillers, fiber reinforcements, fire-retardants, fungi growth-inhibiting agents, etc. to reduce the cost and/or modify the properties of the high-density core layers 72 and 74 (such as but not limited to the compressive strength, the flexibility, the friability, the fire resistance of the core layer). When the low-density core layer 76 is made of a predominantly polymer material foam, the low-density predominantly polymer material foam core layer 76 may contain various powdered and liquid fillers fiber reinforcements, fire-retardants, fungi growth-inhibiting agents, etc. to reduce the cost and/or modify the properties of the low-density foam core layer. Examples of fillers that may be used in the high-density core layers 72 of the cover board 62 and the baseboard 66 and the low-density core layer 76 of the insulation board 64 are fillers such as limestone ($CaCO_3$), fiberglass, recycled polyisocyanurate dust, and extenders/plasticizers.

While, as shown in FIG. 3, the prefabricated roofing panel composite 60 has no facers, the prefabricated roofing panel composite 60 could have a common facer intermediate and bonded to both the bottom major surface of the cover board core layer 72 and the top major surface of the insulation board core layer 76, a common facer intermediate and bonded to both the bottom major surface of the insulation board core layer 76 and the top major surface of the baseboard core layer 74, a top facer bonded to the top major surface of the cover board core layer 72, and/or a bottom facer bonded to the bottom major surface of the baseboard core layer 74. When used, the common facers of the prefabricated roofing panel composite 60 may be any sheet material with good bonding surfaces that facilitates a good bond between the cover board 62, the insulation board 64, and the baseboard 66, such as but not limited to woven or nonwoven mats made of glass fibers, other fibers or filaments, scrims, etc. When used, the top facer of the prefabricated roofing panel composite 60 overlies the entire or substantially the entire top major surface of the high-density core layer 72 of the cover board 62. The top facer of the prefabricated roofing panel composite 60 may be any sheet material that provides a suitable top major surface for the prefabricated roofing panel composite 60, such as but not limited to paper, foil, woven or nonwoven mats made of fiberglass or other fibers or filaments, scrims, etc. When used, the bottom facer of the prefabricated roofing panel composite 60 overlies the entire or substantially the entire bottom surface of the high-density core layer 74 of the baseboard 66. The bottom facer of the prefabricated roofing panel composite 60 may be any sheet material that provides a suitable bottom major surface for the roofing panel composite 60, such as but not limited to paper, foil, woven or nonwoven mats made of fiberglass or other fibers or filaments, scrims, etc.

Figure 4:
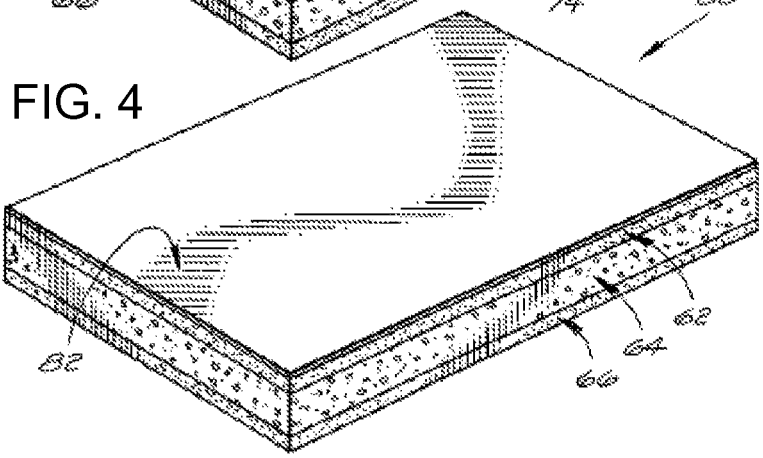
FIG. 4 is a schematic perspective view of presently disclosed a prefabricated roofing panel composite that includes a high-density polymer or predominantly polymer material cover board, a low-density polymer or predominantly polymer material foam insulation board, a high-density polymer or predominantly polymer material baseboard, and a top facer.

FIG. 4 is a schematic perspective view of a presently disclosed prefabricated roofing panel composite 80. The prefabricated roofing panel composite 80 includes the high-density polymer or predominantly polymer material cover board 62, the low-density polymer or predominantly polymer material foam insulation board 64, and the high-density polymer or predominantly polymer material baseboard 66, that, as shown in FIG. 4, are bonded directly together, and a top facer 82. Other than the inclusion of a top facer 82, the prefabricated roofing panel composite 80 of FIG. 4 is the same as the prefabricated roofing panel composite 60 of FIG. 3.

The top facer 82 of the prefabricated roofing panel composite 80 is bonded to and overlies the entire or substantially the entire top surface of the high-density polymer or predominantly polymer material core layer of the cover board 62. The top facer 82 of the prefabricated roofing panel composite 80 may be any sheet material that provides a suitable top major surface for the cover board and facer composite, such as but not limited to paper, foil, woven or nonwoven mats made of fiberglass or other fibers or filaments, scrims, etc. However, a preferred sheet material for the top facer 82 is a sheet material that serves the dual function of providing a facing during the manufacturing process and a waterproofing membrane on the finished product such as but not limited to a bituminous or modified bituminous membrane, or a single ply membrane (e.g., a EPDM, PVC, or TPO membrane). Where the top facer 82 is a waterproofing membrane, the facer may extend beyond the high-density polymer or predominantly polymer material core layer of the cover board 62 on one or more of the four sides of the core layer, e.g., beyond a side edge and an end edge of the top major surface of the core layer to provide membrane overlaps for sealing with the membranes of adjacent panels.

While, as shown in FIG. 4, the prefabricated roofing panel composite 80 only has a top facer 82, the prefabricated roofing panel composite 80 could have a common facer intermediate and bonded to both the bottom major surface of the cover board core layer and the top major surface of the insulation board core layer, a common facer intermediate and bonded to both the bottom major surface of the insulation board core layer and the top major surface of the baseboard core layer, and/or a bottom facer bonded to the bottom major surface of the baseboard core layer. When used, the common facers of the prefabricated roofing panel composite 80 may be any sheet material with good bonding surfaces that facilitates a good bond between the cover board and insulation board and the insulation board and the baseboard, such as but not limited to woven or nonwoven mats made of glass fibers, other fibers or filaments, scrims, etc. When used, the bottom facer of the prefabricated roofing panel composite 80 overlies the entire or substantially the entire bottom surface of the high-density core layer of the baseboard 66. The bottom facer of the prefabricated roofing panel composite 80 may be any sheet material that provides a suitable bottom major surface for the prefabricated roofing panel composite 80, such as but not limited to paper, foil, woven or nonwoven mats made of fiberglass or other fibers or filaments, scrims, etc.

FIG. 5 is a schematic side view of a first production line 100 that can be used to continuously make presently disclosed prefabricated roofing panel composites in line, such as the prefabricated roofing panel composites 30 of FIG. 1 and 50 of FIG. 2. The prefabricated roofing panel composites 30 and 50 each include a high-density polymer or predominantly polymer material cover board 32 and a low-density polymer or predominantly polymer material foam insulation board 34. The production line 100 includes: a first forming station 102 for forming the low-density polymer or predominantly polymer material foam insulation board 34 of the prefabricated roofing panel composites 30 and 50; a second forming station 104 for forming the high-density polymer or predominantly polymer material cover board 32 of the prefabricated roofing panel composites 30 and 50; and a cutting station 106 for cutting the prefabricated roofing panel composites 30 and 50 to length.

The first forming station 102 for forming the low-density foam insulation board 34 includes a conventional dispenser 108 for dispensing a low-density polymer or predominantly polymer material foam precursor 110 (e.g., a low-density polyisocyanurate or predominantly polyisocyanurate foam precursor) onto a facer, when used, overlying a conveyor 112 of two spaced-apart opposed forming conveyers 112 and 114 or directly onto the conveyor 112. As the foam precursor 110 passes between the forming conveyors 112 and 114, foams and at least partially sets, the forming conveyors 112 and 114 cooperate to set the thickness of the low-density polymer or predominantly polymer material foam core layer 42 of the low-density polymer or predominantly polymer foam insulation board 34 formed from the precursor 110. The first forming station 102 also includes supplies (e.g., rolls) of facer materials 116 and 118 that can be fed over and/or beneath the low-density polymer or predominantly polymer material foam precursor 110 to form a common facer of the prefabricated roofing panel composites 30 and 50 and a bottom facer of the prefabricated roofing panel composites 30 and 50.

The second forming station 104 of the production line 100 for forming the high-density polymer or predominantly polymer material cover board 32 of the prefabricated roofing panel composites 30 and 50 includes a conventional dispenser 120 for dispensing a high-density polymer or predominantly polymer material or foam precursor 122 (e.g., a high-density polyisocyanurate or predominantly polyisocyanurate foam precursor) onto the low-density polymer or predominantly polymer material foam core layer 42 or, when used, a common facer overlying the low-density polymer or predominantly polymer material foam core layer 42. With the high-density polymer or predominantly polymer material precursor 122 overlying the low-density foam core layer 42 or, when used, the common facer, the high-density polymer or predominantly polymer material precursor 122 and the low-density foam core layer 42 pass between two spaced-apart opposed forming conveyers 112 and 124 where the high-density polymer or predominantly polymer material core layer 38 is formed and bonded directly to the low-density foam core layer 42 or to the common facer overlying the low-density foam core layer 42. The spaced-apart opposed forming conveyors 112 and 124 cooperate to set the thickness of both the high-density polymer or predominantly polymer material core layer 40 and the prefabricated roofing panel composite 30 or 50. The second forming station 104 also includes supplies (e.g., rolls) of a facer material 126 that is fed over the high-density polymer or predominantly polymer material precursor 122 to form the top facer 52 of both the high-density cover board 32 and the prefabricated roofing panel composite 50.

With the high-density core layer 40 and the low-density foam core layer 42 of the prefabricated roofing panel composite 30 or 50 bonded together in the second forming station 104 to form a continuous length of the prefabricated roofing panel composite 30 or 50, the prefabricated roofing panel composite 30 or 50 is then cut to length to complete the formation of the prefabricated roofing panel composite 30 or 50. In the cutting station 106 a cutter, such as but not limited to a reciprocating cutter 128, cuts the prefabricated roofing panel composite 30 or 50 coming from the second forming station 104 to length.

While the production line 100, as shown, is capable of applying three facer materials 116, 118, and 126 to the insulation board 34 and the cover board 32 to form the prefabricated roofing panel composites 30 and 50. The application of any one, any two, or all of the facing materials 116, 118 and 126 to the insulation board and cover board can be omitted to form the prefabricated roofing panel composite 30 and all but the top facing material can be omitted to form the prefabricated roofing panel composite 50 with the desired number of facers. The facers 116, 118 and 126 normally prevent the polymer or predominantly polymer layers from sticking to the conveyors. However, with a shift in the chemistry of the precursors 110 and 122 to affect the tackiness of the layers produced so that they do not stick to the surfaces of the conveyors or by applying release films or coatings to the surfaces of the conveyors that will not allow the layers produced to stick to the surfaces of the conveyors, when desired, any one or all of the facing materials are not needed for and could be eliminated from the manufacturing process.

FIG. 6 is a schematic side view of a second production line 200 that can be used to continuously make presently disclosed prefabricated roofing panel composites, such as the prefabricated roofing panel composites 30 of FIG. 1 and 50 of FIG. 2. The prefabricated roofing panel composites 30 and 50 each include a high-density polymer or predominantly polymer material cover board and a low-density polymer or predominantly polymer material foam insulation board. The production line 200 includes: an in-feed conveyor 202 for continuously feeding a series of low-density polymer or predominantly polymer material foam insulation boards 34 of the prefabricated roofing panel composite into a forming station 204; the forming station 204 for forming the high-density polymer or predominantly polymer material cover board 32 of the prefabricated roofing panel composites 30 and 50; and a cutting station 206 for cutting the prefabricated roofing panel composites 30 and 50 to length.

The low-density polymer or predominantly polymer material foam insulation boards 34 may include a top facer that, when used, forms a common facer of the prefabricated roofing panel composites 30 and 50 and may include a bottom facer that, when used, forms a bottom facer of the prefabricated roofing panel composites. Preferably, the low-density polymer or predominantly polymer material foam insulation boards 34 are fed into the forming station 204 lengthwise with the ends of successive insulation boards 34 in the continuous series of insulation boards abutting each other.

The forming station 204 of the production line 200 for forming the high-density polymer or predominantly polymer material cover board 32 of the prefabricated roofing panel composite 30 includes a conventional dispenser 208 for dispensing the high-density polymer or predominantly polymer material precursor 210 (e.g., a high-density polyisocyanurate or predominantly polyisocyanurate precursor) directly onto the low-density foam core layers 42 of the insulation boards 34 or, when used the common facers overlying the low-density foam core layers of the low-density foam insulation boards. With the high-density polymer or predominantly polymer material precursor 210 directly overlying the low-density foam core layers 42 of the insulation boards or the common facers 36 carried by the low-density foam insulation boards 34, the high-density polymer or predominantly polymer material precursor 210 and the low-density foam insulation boards 34 pass between two spaced-apart opposed forming conveyers 212 and 214 where the high-density polymer or predominantly polymer material core layers 38 of the cover boards 32 are formed and bonded directly to the low-density foam core layers 42 of the insulation boards 34 or to the common facers overlying the low-density foam insulation board 34. The spaced-apart opposed forming conveyors 212 and 214 cooperate to set the thickness of both the high-density polymer or predominantly polymer material core layer 40 and the prefabricated roofing panel composite 30 or 50. The forming station 204 also includes supplies (e.g., rolls) of a facer material 216 that is fed over the high-density polymer or predominantly polymer material precursor 210 to form the top facer 52 of both the high-density polymer or predominantly polymer material cover board 32 and the prefabricated roofing panel composite 50.

With the high-density core layer 40 and the low-density foam core layer 42 of the prefabricated roofing panel composite 30 or 50 bonded together in the forming station 204 to form a continuous length of the prefabricated roofing panel composite 30 or 50, the prefabricated roofing panel composite 30 or 50 is then cut to length to complete the formation of the prefabricated roofing panel composite 30 or 50. In the cutting station 206 a cutter, such as but not limited to a reciprocating cutter 218, cuts the prefabricated roofing panel composite 30 coming from the forming station 204 to length.

The production line 200, as shown, is capable of making the prefabricated roofing panel composite 30 by feeding preformed low-density polymer or predominantly polymer material foam insulation boards 34 into the forming station 204 and omitting the application of the facer material 216 to the cover board 32 and is capable of making the prefabricated roofing panel composite 50 by feeding preformed low-density polymer or predominantly polymer material foam insulation boards 34 into the forming station 204 and applying of the facer material 216 to the cover board 32. The facer 216 normally prevents the high-density polymer or predominantly polymer material layer from sticking to the conveyor 212. However, with a shift in the chemistry of the precursor 210 to affect the tackiness of the layer produced so that the layer does not stick to the surface of the conveyor 212 or by applying a release film or coating to the surface of the conveyer 212 that will not allow the layer produced to stick to the surface of the conveyor, when desired, the facing materials 216 is not needed for and could be eliminated from the manufacturing process.

Figure 7:
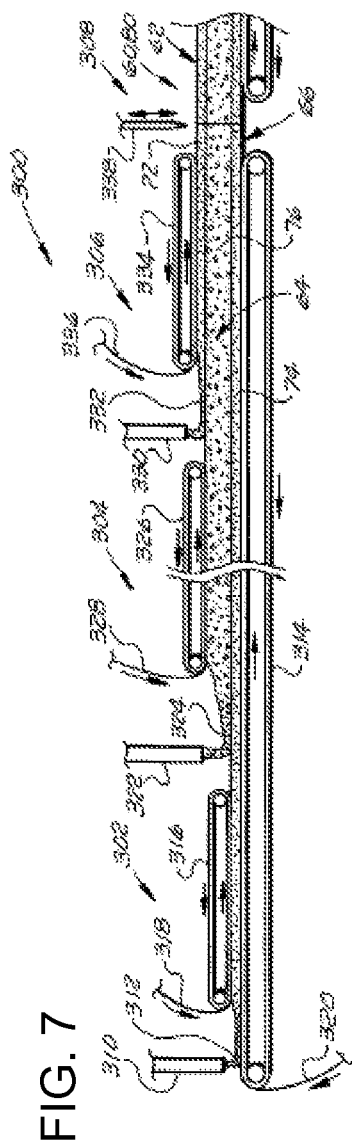
FIG. 7 is a schematic side view of a production line that can be used to make a presently disclosed prefabricated roofing panel composite that includes a high-density polymer or predominantly polymer material cover board, a low-density polymer or predominantly polymer material foam insulation board, and a high-density polymer or predominantly polymer material baseboard.

FIG. 7 is a schematic side view of a production line 300 that can be used to continuously make a presently disclosed prefabricated roofing panel composite, such as the prefabricated roofing panel composites 60 of FIG. 3 and 80 of FIG. 4. These prefabricated roofing panel composites each include: a high-density polymer or predominantly polymer material cover board 62, a low-density polymer or predominantly polymer material foam insulation board 64, and a high-density polymer or predominantly polymer material baseboard 66. The production line 300 includes: a first forming station 302 for forming the high-density polymer or predominantly polymer material baseboard 66 of the prefabricated roofing panel composites 60 and 80; a second forming station 304 for forming the low-density polymer or predominantly polymer material foam insulation board 64 of the prefabricated roofing panel composites 60 and 80; a third forming station 306 for forming the high-density polymer or predominantly polymer material cover board 62 of the prefabricated roofing panel composites 60 and 80; and a cutting station 308 for cutting the prefabricated roofing panel composites 60 and 80 to length.

The first forming station 302 for forming the high-density polymer or predominantly polymer material baseboard 56 includes a conventional dispenser 310 for dispensing a high-density polymer or predominantly polymer material precursor 312 (e.g., a high-density polyisocyanurate or predominantly polyisocyanurate precursor) onto a facer, when used, overlying a conveyor 314 of two spaced-apart opposed forming conveyors 314 and 316 or directly onto the conveyor 314. As the precursor 310 passes between the forming conveyors 314 and 316, forms and at least partially sets, the forming conveyors 314 and 316 cooperate to set the thickness of the high-density polymer or predominantly polymer material core layer 74 of the high-density baseboard 66 formed from the precursor 310. The first forming station 302 also includes supplies (e.g., rolls) of facer materials 318 and 320 that may be fed over and/or beneath the high-density polymer or predominantly polymer material precursor 310 to form, when used, a common facer of the prefabricated roofing panel composites 60 and 80 and a bottom facer of the prefabricated roofing panel composites 60 and 80.

The second forming station 304 of the production line 300 for forming the low-density polymer or predominantly polymer material foam insulation board 64 of the prefabricated roofing panel composites 60 and 80 includes a conventional dispenser 322 for dispensing a low-density polymer or predominantly polymer material foam precursor 324 (e.g., a low-density polyisocyanurate or predominantly polyisocyanurate foam precursor) directly onto the high-density core layer 74 or, when used, onto a common facer overlying the high-density core layer 74 of the baseboard 66. With the low-density polymer or predominantly polymer material foam precursor 324 directly overlying high-density core layer 74 or the common facer overlying the high-density core layer 74 of the baseboard 66, the low-density polymer or predominantly polymer material foam precursor 324 and the high-density core layer 74 pass between two spaced-apart opposed forming conveyors 314 and 326 where the low-density polymer or predominantly polymer material foam core layer 76 of the insulation board 64 is formed and bonded to the high-density core layer 74 or the common facer overlying the high-density core layer 74 of the baseboard 66. The spaced-apart opposed forming conveyors 314 and 326 cooperate to set the thickness of the low-density polymer or predominantly polymer material foam core layer 76 of the insulation board 64. The second forming station 304 also includes supplies (e.g., rolls) of a facer material 328 that can be fed over the low-density polymer or predominantly polymer material foam precursor 324 to form a common facer of the prefabricated roofing panel composites 60 and 80.

The third forming station 306 of the production line 300 for forming the high-density polymer or predominantly polymer material cover board 62 of the prefabricated roofing panel composites 60 and 80 includes a conventional dispenser 330 for dispensing a high-density polymer or predominantly polymer material precursor 332 (e.g., a high-density polyisocyanurate or predominantly polyisocyanurate precursor) directly onto the low-density foam core layer 76 or the common facer overlying the low-density foam core layer 76 of the insulation board 64. With the high-density polymer or predominantly polymer material precursor 332 overlying the low-density foam core layer 76 or the common facer overlying the low-density foam core layer 76, the high-density polymer or predominantly polymer material precursor 332, the low-density foam insulation board 64, and the high-density baseboard 66 pass between two spaced-apart opposed forming conveyors 314 and 334 where the high-density polymer or predominantly polymer material core layer 72 of the cover board 62 is formed and bonded to the low-density foam core layer 76 or the common facer overlying the low-density foam core layer 76 of the insulation board 64. The spaced-apart opposed forming conveyors 314 and 334 cooperate to set the thickness of both the high-density polymer or predominantly polymer material core layer 72 and the prefabricated roofing panel composite 60 or 80. The third forming station 306 also includes supplies (e.g., rolls) of a facer material 336 that is fed over the high-density polymer or predominantly polymer material precursor 332 to form the top facer 82 of both the high-density cover board 62 and the prefabricated roofing panel composite 80.

With the high-density polymer or predominantly polymer material cover board 62, the low-density polymer or predominantly polymer material foam insulation board 64, and the high-density polymer or predominantly polymer material baseboard 66 of the prefabricated roofing panel composites 60 or 80 bonded together in the third forming station 306 to form a continuous length of the prefabricated roofing panel composite 60 or 80, the prefabricated roofing panel composite 60 or 80 is then cut to length to complete the formation of the prefabricated roofing panel composite 60 or 80. In the cutting station 308 a cutter, such as but not limited to a reciprocating cutter 338, cuts the continuous prefabricated roofing panel composite 60 or 80 coming from the third forming station 306 to length.

While the production line 300, as shown, is capable of applying four facer materials 318, 320, 328, and 336 to the baseboard 66, the insulation board 64 and the cover board 62 to form the prefabricated roofing panel composites 60 and 80. The application of any one, any two, any three or all of the facing materials 318, 320, 328, and 336 to the baseboard, the insulation board and the cover board can be omitted to form the prefabricated roofing panel composite 60 and all but the top facing material can be omitted to form the prefabricated roofing panel composite 80 with the desired number of facers. The facers 318, 320, 328, and 336 normally prevent the composite layers from sticking to the conveyors. However, with a shift in the chemistry of the precursors 312, 324, and 332 to affect the tackiness of the layers produced so that they do not stick to the surfaces of the conveyors or by applying release films or coatings to the surfaces of the conveyors that will not allow the layers produced to stick to the surfaces of the conveyors, when desired, any one or all of the facing materials are not needed for and could be eliminated from the manufacturing process.

Figure 8:
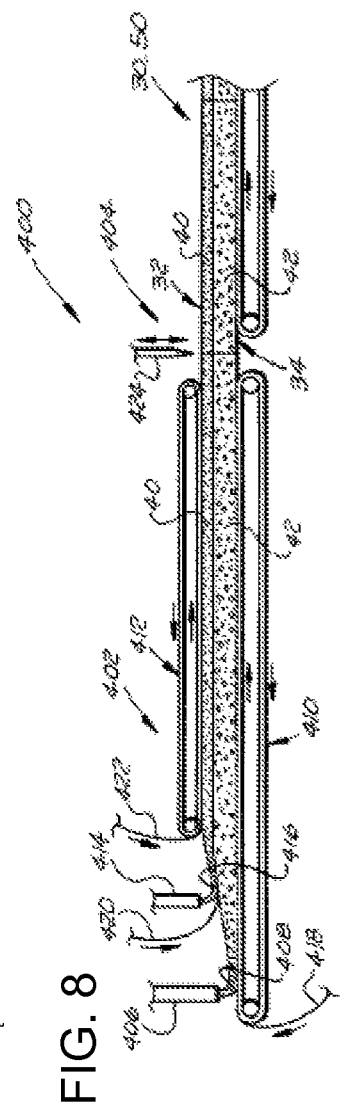
FIG. 8 is a schematic side view of a third production line that can be used to make a presently disclosed prefabricated roofing panel composite that includes a high-density polymer or predominantly polymer material cover board and a low-density polymer or predominantly polymer material foam insulation board.

FIG. 8 is a schematic side view of another production line 400 that can be used to continuously make presently disclosed prefabricated roofing panel composites in line, such as the prefabricated roofing panel composites 30 of FIG. 1 and 50 of FIG. 2. The prefabricated roofing panel composites 30 and 50 each include a high-density polymer or predominantly polymer material cover board 32 and a low-density polymer or predominantly polymer material foam insulation board 34. The production line 400 includes: a forming station 402 for forming the low-density polymer or predominantly polymer material foam insulation board 34 and the high-density polymer or predominantly polymer material cover board 32 of the prefabricated roofing panel composites 30 and 50; and a cutting station 404 for cutting the prefabricated roofing panel composites 30 and 50 to length.

The forming station 402 for forming the low-density foam insulation board 34 and the high-density cover board includes a conventional dispenser 406 for dispensing a low-density polymer or predominantly polymer material foam precursor 408 (e.g., a low-density polyisocyanurate or predominantly polyisocyanurate foam precursor) onto a facer, when used, overlying a conveyor 410 of two spaced-apart opposed forming conveyors 410 and 412 or directly onto the conveyor 410. The forming station 402 also includes a conventional dispenser 414 for dispensing a high-density polymer or predominantly polymer material precursor 416 (e.g., a high-density polyisocyanurate or predominantly polyisocyanurate material precursor) onto the low-density polymer or predominantly polymer material foam precursor of the core layer 42 or, when used, a common facer overlying the low-density polymer or predominantly polymer material foam precursor of the core layer 42. As the layers of precursor 408 and 416 pass between the forming conveyors 410 and 412, the precursors form and at least partially set, the forming conveyors 410 and 412 cooperate to set the thickness of the low-density polymer or predominantly polymer material foam core layer 42 of insulation board 34 formed from the precursor 408, the thickness of the high-density polymer or predominantly polymer material core layer 40 of cover board 32 formed from the precursor 416, and the thickness of the prefabricated roofing panel composite 30 or 50. The forming station 402 also includes supplies (e.g., rolls) of facer materials 418, 420, and 422 that can be fed over and/or beneath the low-density polymer or predominantly polymer material foam precursor 408 to form a common facer of the prefabricated roofing panel composites 30 and 50 and a bottom facer of the prefabricated roofing panel composites 30 and 50 and that can be fed over the high-density polymer or predominantly polymer material precursor 416 to form a top facer of the prefabricated roofing panel composites 30 and 50.

With the high-density core layer 40 and the low-density foam core layer 42 of the prefabricated roofing panel composite 30 or 50 bonded together to form a continuous length of the prefabricated roofing panel composite 30 or 50, the prefabricated roofing panel composite 30 or 50 is then cut to length to complete the formation of the prefabricated roofing panel composite 30 or 50. In the cutting station 404 a cutter, such as but not limited to a reciprocating cutter 424, cuts the prefabricated roofing panel composite 30 or 50 coming from the forming station 402 to length.

While the production line 400, as shown, is capable of applying three facer materials 418, 420 and 422 to the insulation board 34 and the cover board 32 to form the prefabricated roofing panel composites 30 and 50. The application of any one, any two, or all of the facing materials 418, 420, and 422 to the insulation board and cover board can be omitted to form the prefabricated roofing panel composite 30 and all but the top facing material can be omitted to form the prefabricated roofing panel composite 50 with the desired number of facers. The facers 418, 420, and 422 normally prevent the layers of the composite from sticking to the conveyors. However, with a shift in the chemistry of the precursors 408 and 416 to affect the tackiness of the layers produced so that they do not stick to the surfaces of the conveyors or by applying release films or coatings to the surfaces of the conveyors that will not allow the layers produced to stick to the surfaces of the conveyors, when desired, any one or all of the facing materials are not needed for and could be eliminated from the manufacturing process.

Preferably, the low-density polymer or predominantly polymer material foam precursors 110, 324, and 408 are low-density polyisocyanurate or predominantly polymer foam precursors. Preferably, the high-density polymer or predominantly polymer material precursors 122, 210, 312, 332, and 416 are high-density polyisocyanurate or predominantly polyisocyanurate material precursors. The high-density polymer or predominantly polymer material precursors 122, 210, 312, 332, and 416 can be formulated to produce high-density materials or foams by significantly reducing or eliminating the blowing agent(s) from the precursors 122, 210, 312, 332, and 416. Pentane (HFC), micro-spheres, $CO_2$ and water (as well as other materials) will act as blowing agents for the precursors. The relatively high-density layers produced using these types of precursors have improved strength characteristics over the low-density foams normally produced for insulation products. As the amount of blowing agent is reduced in the precursors 122, 210, 312, 332, and 416, the density and the compressive strength of the high-density layers produced increase. These types of high-density core layers are much more resistant to deformation than the typical low-density foam core layers.

While various embodiments have been described, it is to be understood that variations and modifications can be resorted to as will be apparent to those skilled in the art. For example, the prefabricated roofing panel composites could be in an upside down orientation to that shown and described in connection with the Figures. Such variations and modifications are to be considered within the purview and scope of the claims appended hereto.

The invention claimed is:

1. A prefabricated roofing system panel comprising:
   a cover board; the cover board comprising a high-density predominantly polymer material core layer; the high-density core layer of the cover board having a density between 6 lbs/ft$^3$ and 25 lbs/ft$^3$; the high-density core layer of the cover board having a length, a width, and a thickness; the high density core layer of the cover board having a top major surface and a bottom major surface that are each defined by the length and the width of the high density core layer, wherein the high-density predominantly polymer material of the cover board core layer comprises polyisocyanurate;
   an insulation board, the insulation board comprising a low-density predominantly polymer material foam core layer; the low-density foam core layer of the insulation board having a density less than or equal to about 2 lbs/ft$^3$; the low-density foam core layer of the insulation board having a length, a width, and a thickness; the low-density foam core layer of the insulation board having as top major surface and a bottom major surface that are each defined by the length and the width of the low-density foam core layer; and
   the bottom major surface of the high-density core layer of the corer board being bonded to the top major surface of the low-density foam core layer of the insulation board; and the bottom major surface of the high-density core layer of the cover board and the top major surface of the low-density foam core layer of the insulation board being substantially coextensive.

2. The prefabricated roofing system panel according to claim 1, wherein:

the thickness of the high-density core layer of the cover board is about 0.25-0.5 inches; and the thickness of the low density foam core layer of the insulation board is about 0.50-3.50 inches.

3. The prefabricated roofing system panel according to claim 1, wherein:
the lengths and widths of the high-density core layer of the cover board and the low-density foam core layer of the insulation board are each about 4 feet or greater.

4. The prefabricated roofing system panel according to claim 1, wherein:
the lengths of the high-density core layer of the cover board and the low-density foam core layer of the insulation board are each about 8 feet or greater; and the widths of the high-density core layer of the cover board and the low-density foam core layer of the insulation board are each about 4 feet or greater.

5. The prefabricated roofing system panel according to claim 1, wherein:
the polymer material of the high-density core layer of the cover board and the low-density foam core layer of the insulation board is polyisocyanurate.

6. The prefabricated roofing system panel according to claim 1, wherein:
the high-density core layer of the cover board is a high-density predominantly polymer material foam core layer.

7. The prefabricated roofing system panel according to claim 1, wherein:
the cover board includes a top facer that overlies and is bonded to the top major surface of the high-density core layer of the cover board;
the insulation board includes a bottom facer that overlies and is bonded to the bottom major surface of the low-density foam core layer of the insulation board; and
the cover board and the insulation board have a common facer that overlies and is bonded to the bottom major surface of the high-density core layer of the cover board and the top major surface of the low-density foam core layer of the insulation board.

8. The prefabricated roofing system panel according to claim 7, wherein:
the top facer of the cover board is a waterproofing membrane.

9. The prefabricated roofing system panel according to claim 1, including:
a baseboard comprising a high-density predominantly polymer material core layer; the high-density core layer of the baseboard having a density between 6 lbs/ft$^3$ and 25 lbs/ft$^3$; the high-density core layer of the baseboard having a length, a width, and a thickness; the high-density core layer of the baseboard having a top major surface and a bottom major surface that are defined by the length and the width of the high-density core layer of the baseboard; and
the bottom major surface of the low-density foam core layer of the insulation board being bonded to the top major surface of the high-density core layer of the baseboard; and the bottom major surface of the low-density foam core layer of the insulation board and the top major surface of the high-density core layer of the baseboard being substantially coextensive.

10. The prefabricated roofing system panel according to claim 9, wherein:
the cover board includes a top facer that overlies and is bonded to the top major surface of the high-density core layer of the cover board;
the baseboard includes a bottom facer that overlies and is bonded to the bottom major surface of the high-density core layer of the baseboard;
the cover board and the insulation board have a common facer that overlies and is bonded to the bottom major surface of the high-density core layer of the cover board and the top major surface of the low-density foam core layer of the insulation board; and
the baseboard and the insulation board have a common facer that overlies and is bonded to the top major surface of the high-density core layer of the baseboard and the bottom major surface of the low-density foam core layer of the insulation board.

11. The prefabricated roofing system panel according to claim 10, wherein:
the top facer of the cover board is a waterproofing membrane.

12. A prefabricated roofing system panel comprising:
a cover board; the cover board comprising a high-density predominantly polymer material core layer; the high-density core layer of the cover board having a density between 6 lbs/ft$^3$ and 25 lbs/ft$^3$; the high-density core layer of the cover board having a length, a width, and a thickness; the high density core layer of the cover board having a top major surface and as bottom major surface that are each defined by the length and the width of the high density core layer;
an insulation board, the insulation board comprising a low-density predominantly polymer material foam core layer; the low-density foam core layer of the insulation board having a density less than or equal to about 2 lbs/ft$^3$; the low-density foam core layer of the insulation board having a length, a width, and a thickness; the low-density foam core layer of the insulation board having a top major surface and a bottom major surface that are each defined by the length and the width of the low-density foam core layer;
the bottom major surface of the high-density core layer of the cover board and the top major surface of the low-density foam core layer of the insulation board being, substantially coextensive; and
the cover board and the insulation board have a common nonwoven mat facer that overlies and is bonded to the bottom major surface of the high-density core layer of the cover board and the top major surface of the low-density foam core layer of the insulation board to bond the cover board and the insulation board together.

13. The prefabricated roofing system panel according to claim 12, wherein;
the cover board includes a top facer overlying and bonded to the top major surface of the high-density predominately polymer material core layer; and the top facer comprises a nonwoven mat.

14. The prefabricated roofing system panel according to claim 13, wherein:
the nonwoven mat of the top facer is a nonwoven fiberglass mat.

15. The prefabricated roofing system panel according to claim 14, wherein:
the top facer is a waterproof membrane.

16. The prefabricated roofing system panel according to claim 15, wherein:
the top lacer extends beyond a side edge and an end edge of the top major surface of the high-density predominately polymer material core layer of the cover board.

17. The prefabricated roofing system panel according to claim 12, wherein:

the thickness of the high-density core layer of the cover hoard is about 0.25-0.5 inches; and the thickness of the low density foam core layer of the insulation board is about 0.50-3.50 inches.

18. The prefabricated roofing system panel according to claim 12, wherein:
the lengths and widths of the high-density core layer of the cover board and the low-density foam core layer of the insulation board are each about 4 feet or greater.

19. The prefabricated roofing system panel according to claim 12, wherein:
the lengths of the high-density core layer of the cover hoard and the low-density foam core layer of the insulation board are each about 8 feet or greater; and the widths of the high-density core layer of the cover board and the low-density foam core layer of the insulation board are each about 4 feet or greater.

20. The prefabricated roofing system panel according to claim 19, wherein:
the polymer material of the high-density core layer of the cover board anti the low-density foam core layer of the insulation board is polyisocyanurate.

21. The prefabricated rooting system panel according claim 20, wherein:
high-density core layer of the cover board is a high-density predominantly polymer material foam core layer.

22. The prefabricated roofing system panel according to claim 12, wherein:
the nonwoven mat of the common nonwoven mat facer is a fiberglass mat.

23. The prefabricated roofing system panel according to claim 22, wherein:
the insulation board includes a bottom facer that overlies and is bonded to the bottom major surface of the low-density foam core layer of the insulation board; and the bottom facer comprises a nonwoven mat.

24. The prefabricated roofing system panel according to claim 12, including:
a baseboard comprising as thigh-density predominantly polymer material core layer; the high-density core layer of the baseboard having a density between 6 lbs/ft$^3$ and 25 lbs/ft$^3$; the high-density core layer of the baseboard having a length, a width, and a thickness; the high-density core layer of the baseboard having a top major surface and as bottom major surface that are defined by the length and the width of the high-density core layer of the baseboard; and
the bottom major surface of the low-density foam core layer of the insulation board is bonded to the top major surface of the high-density core layer of the baseboard; and the bottom major surface of the low-density foam core layer of the insulation board and the top major surface of the high-density core layer of the baseboard are substantially coextensive.

25. The prefabricated roofing system panel according to claim 24, wherein:
the cover board includes a top facer overlying and bonded to the top major surface of the high-density predominately polymer material core layer;
the baseboard includes a bottom facer that overlies and is bonded to the bottom major surface of the high-density core layer of the baseboard; and
the baseboard and the insulation board have a common facer that overlies and is bonded to the top major surface of the high-density core layer of the baseboard and the bottom major surface of the low-density foam core layer of the insulation board.

26. The prefabricated roofing system panel according to claim 25, wherein:
the top facer, the bottom facer, and the common facers each comprise a nonwoven mat.

27. The prefabricated rooting system panel according to claim 26, wherein:
the top facer is a waterproof membrane.

* * * * *